April 28, 1931.  M. E. WELCH  1,802,398
SIDE LIGHT FOR AUTOMOBILES
Filed Feb. 13, 1929  2 Sheets-Sheet 1
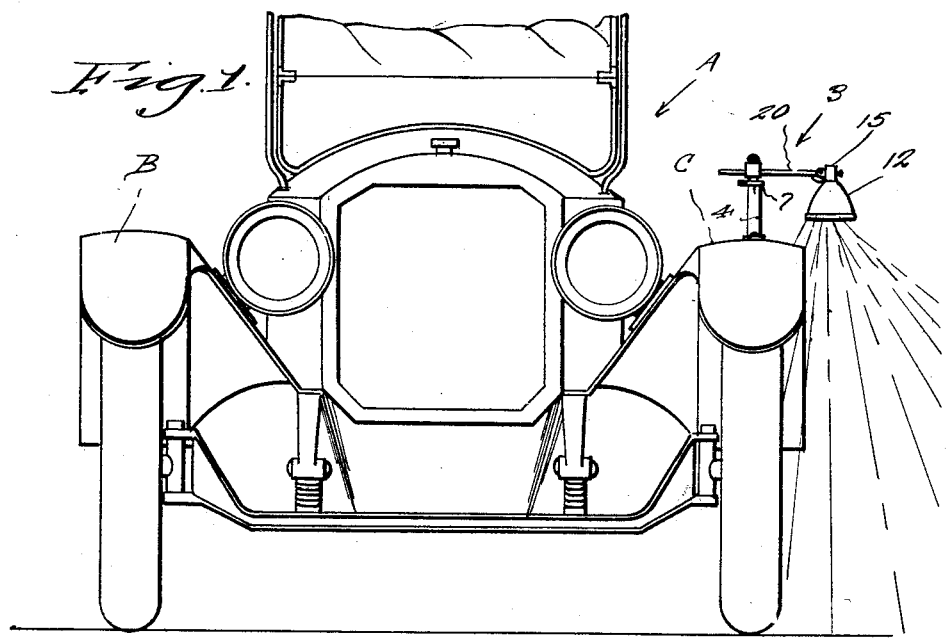
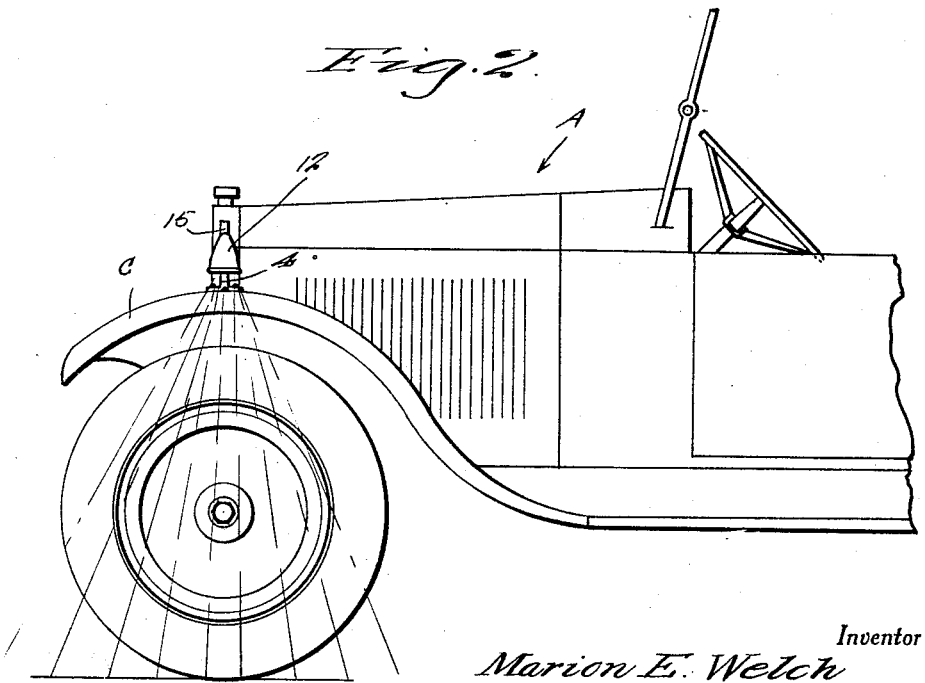
Inventor
Marion E. Welch
By Clarence A. O'Brien
Attorney

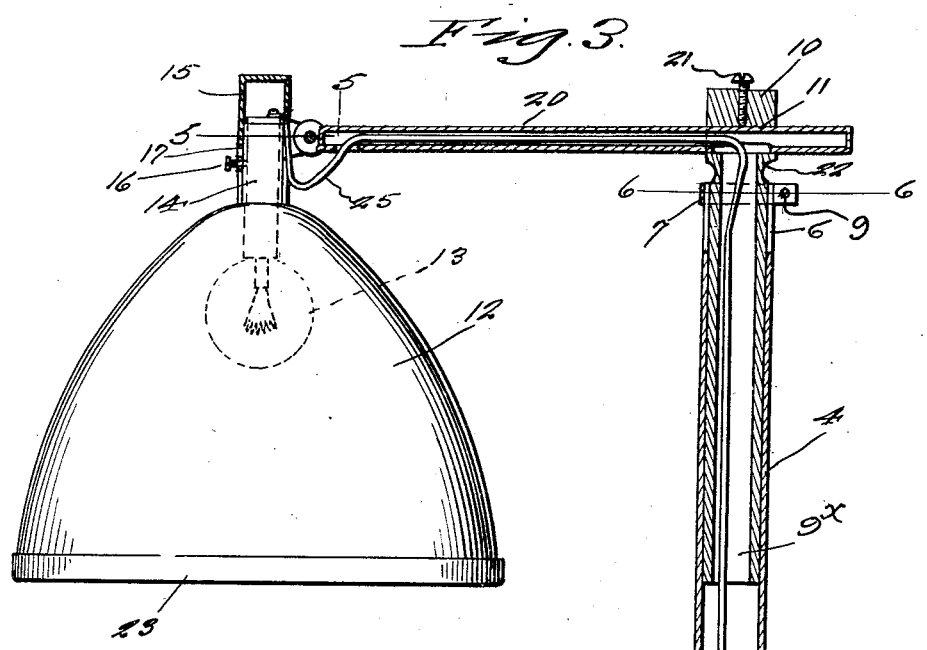
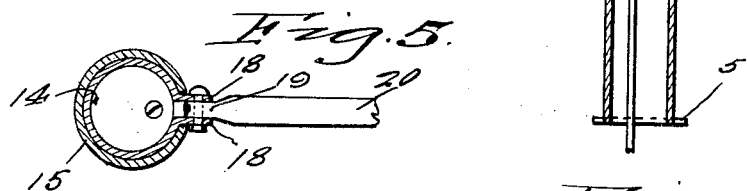
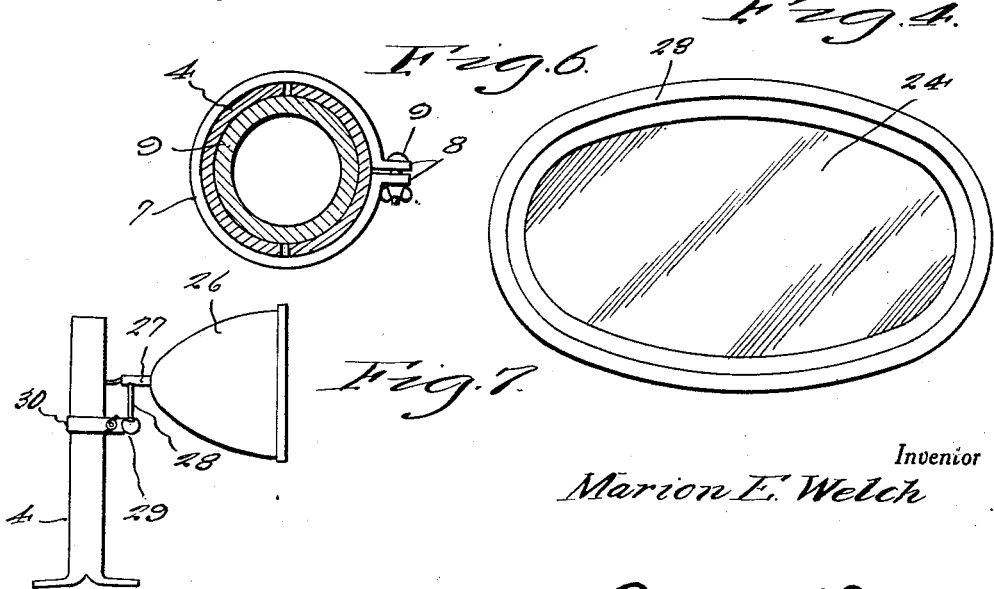

Patented Apr. 28, 1931

1,802,398

UNITED STATES PATENT OFFICE

MARION ERNEST WELCH, OF HIGH POINT, NORTH CAROLINA, ASSIGNOR OF FORTY-NINE ONE HUNDREDTHS TO EARL T. BUTERBAUGH, OF HIGH POINT, NORTH CAROLINA, AND FIFTY-ONE ONE HUNDREDTHS TO HESTER H. WELCH, OF HIGH POINT, NORTH CAROLINA

SIDE LIGHT FOR AUTOMOBILES

Application filed February 13, 1929. Serial No. 339,633.

The present invention appertains to new and useful improvements in the art known as illumination, and more particularly, the invention has reference to a novel side light for automobiles, and its greatest object is to provide a light for disposition upon the forward left side of an automobile, so as to illuminate the forward left wheel and that portion of the roadway lateral thereto.

Another object of the invention is to provide a light of this character, capable of being adjusted for use on various types of automobiles, so as to adequately illuminate the forward left side portion of the vehicle and the roadway lateral thereto, so that approaching automobiles may readily judge the space clearance in passing.

Another object of the invention is to provide means for illuminating the entire left side of the automobile, including the running board.

These and other objects of the invention will become more apparent to the reader after considering the invention as described and claimed hereinafter.

In the drawing:—

Figure 1 represents a front elevation of a conventional automobile construction, equipped with the improved side light.

Fig. 2 is a fragmentary side elevation of the forward left side portion of an automobile equipped with the improved side light.

Fig. 3 is a vertical sectional view through the improved device.

Fig. 4 is a bottom plan view of the light casing, looking toward the lens.

Fig. 5 is a sectional view taken substantially on the line 5—5 of Fig. 3.

Fig. 6 is a sectional view taken substantially on the line 6—6 of Fig. 3.

Fig. 7 is a side elevation of the auxiliary lamp which may be secured to the lamp support shown in Fig. 3.

Referring to the drawings wherein like numerals designate like parts, an automobile of conventional design is denoted by A and includes the usual right and left forward fenders B and C respectively. In Fig. 1, the improved side light is generally referred to by the numeral 3 and in Fig. 3, the construction of this device is shown in detail.

The device includes a hollow support 4 suitably flanged at its lower end 5 to permit its attachment upon the left fender C, in substantially the manner shown in Fig. 1. The upper end portion of the support is longitudinally split at predetermined intervals as at 6, and this end portion of the support is adapted to circumferentially receive a clamping band 7 provided with outwardly bent lugs 8 at its free end to receive a tensioning means 9.

Slidably disposed within the support 4 is a hollow post $9x$ provided with a solid head 10 which normally projects above the upper end of the hollow support 4. The post $9x$ is provided in its head 10 with a transversely disposed bore 11 which communicates with the interior of the hollow post.

A lamp casing 12 is provided and preferably has its inner surface silvered to provide a reflector for projecting the light from the bulb 13, carried by the adjustable socket structure 14. The central portion of the casing 12 is provided with an outwardly projecting cap 15, for encasing the socket structure 14, a screw 16 projecting from the socket structure to a slot 17 in the cap to permit the adjustment of the socket member to vary the focus of the bulb 13.

The opposite side portion of the cap 15 is also slotted to receive the projecting ears 18—18 on the socket structure 14. Between the ears 18—18 is pivotally connected the flattened end portion 19 of a hollow rod 20, which is slidably disposed through the bore 11 and capable of being secured to the head 10 by the biting action of the screw 21 threadedly engaged through the head 10 for engagement against the said hollow rod 20.

The hollow rod 20 is provided with an opening 22 to permit the communication of its interior with the interior of the post 9. As is evident by Fig. 4, the casing 12 and its reflector is of elliptical cross section, so as to cause the spreading of the light beams over a relatively extensive area in a lateral direction relatively to the automobile.

Fig. 4 shows a rim 23 for securing the lens 24 to the open side of the casing 12. In Fig. 3, it is seen that the conductor 25 is led from the socket structure 14 through the hollow rod 20, opening 22, and through the hollow post 9 and support 4 to the lighting system of the automobile.

Fig. 7 shows an auxiliary projector for the structure shown in Fig. 3, this auxiliary projector consisting of the casing 26 provided with a shank 27 projecting from a central portion and equipped with a laterally disposed shank 28 provided with a ball for engagement within the socket member 29.

A clamp bracket 30 supports the socket 29 and is engaged around an intermediate portion of the hollow support 4 in the manner disclosed in Fig. 7. It will thus be seen that by loosening the clamp band 7, the hollow post 9 may be elevated or rotated to the extent desired.

To attain further adjustment, the rod 20 may be slid through the bore 11 of the head 10 and the set screw 21 loosened. In working upon the motor of the automobile, these adjustments may be carried out and the casing 12 swung vertically on its pivot connection at the ears 18—18 without removing the casing from its support. Attention is also directed to the fact that the rod 20, the post 9 and the support 4 act as a conduit for the conductor 25, thus protecting the conductor from weather conditions, and wear caused by constant flexing when in a loose state.

It is also to be understood that certain changes in the specific shape, size, materials, may be resorted to in the construction of this device, without departing from the spirit and scope of the invention as claimed hereinafter.

Having thus described my invention, what I claim as new is:—

1. A light comprising a hollow support split at one end, an adjustable clamp about said end, a hollow post adjustably fixed by said clamp in said support and having a head with a transverse bore therein in communication with the interior of the post, a set screw bearing in said head and extending to said bore, a hollow rod adjustable in said bore and engaged by said screw and having a flat end portion, a lamp socket having laterally projecting means swingably and adjustably connected to said end portion, and a casing having a slotted cap receiving and adjustable lengthwise on said socket and its laterally projecting means and adjustably fixed to the socket.

2. In combination a rod having a flat end portion, a lamp socket having laterally projecting means swingably and adjustably connected to said end portion, and a casing having a slotted cap receiving and adjustable lengthwise on said socket and its laterally projecting means and adjustably fixed to the socket.

In testimony whereof I affix my signature.

MARION ERNEST WELCH.